United States Patent
Meier (10) Patent No.: US 11,018,693 B2
(45) Date of Patent: May 25, 2021

(54) SYSTEM AND METHOD FOR CONTINUOUSLY VERIFYING DEVICE STATE INTEGRITY

(71) Applicant: Maxim Integrated Products, Inc., San Jose, CA (US)

(72) Inventor: Pascal Constantin Hans Meier, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/450,577

(22) Filed: Jun. 24, 2019

(65) Prior Publication Data

US 2020/0021308 A1 Jan. 16, 2020

Related U.S. Application Data

(60) Provisional application No. 62/697,111, filed on Jul. 12, 2018.

(51) Int. Cl.
*H03M 13/00* (2006.01)
*H03M 13/09* (2006.01)
*G11C 7/10* (2006.01)
*H04L 29/06* (2006.01)
*G06F 21/44* (2013.01)

(52) U.S. Cl.
CPC ............ *H03M 13/09* (2013.01); *G06F 21/44* (2013.01); *G11C 7/1066* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 7,634,713 B1 * | 12/2009 | Ngo | ................. | G01R 31/31816 |
| | | | | 714/718 |
| 8,125,243 B1 * | 2/2012 | Wright | ...................... | G05F 1/46 |
| | | | | 326/41 |
| 8,281,215 B1 | 10/2012 | Ngo | | |

(Continued)

OTHER PUBLICATIONS

Using a Hardware or Software CRC with Enhanced Core PIC16F1xxx in Class B Applications, Microchip App Note AN1817, http://ww1.microchip.com/downloads/en/AppNotes/00001817A.

*Primary Examiner* — Mujtaba M Chaudry
(74) *Attorney, Agent, or Firm* — North Weber and Baugh LLP; Michael North (57) ABSTRACT

Various embodiments of the invention relate to continuously verifying semiconductor device state integrity. A counter is combined to form part of the Cyclic Redundancy Check (CRC) calculation for control register within the semiconductor device. The counter is initialized to zero and resets after a predetermined number of cycles. The counter value is added to the currently calculated CRC value to get a combined CRC value. Every time a CRC value is calculated for the register bank, the counter value is updated, e.g. incremented. If the CRC calculation is repeated enough times, the counter value will reach its maximum value, and then roll over to its initial value of zero. If no errors occur in the register bank, the combined CRC value at the rolling over point will match an initial combined CRC value. Such a repetitive pattern of the combined CRC value may be used to continuously monitor control register integrity.

18 Claims, 4 Drawing Sheets

(56) References Cited

U.S. PATENT DOCUMENTS

| | | | |
|---|---|---|---|
| 2005/0071730 A1* | 3/2005 | Moyer | H03K 19/17764 |
| | | | 714/758 |
| 2014/0009785 A1* | 1/2014 | Seki | G03G 21/14 |
| | | | 358/1.15 |
| 2015/0303926 A1* | 10/2015 | Tahiri | H03K 19/17704 |
| | | | 326/40 |
| 2017/0269151 A1* | 9/2017 | Favi | G01R 31/2856 |
| 2019/0147188 A1* | 5/2019 | Benaloh | H04L 63/0442 |
| | | | 726/26 |

* cited by examiner

SYSTEM AND METHOD FOR CONTINUOUSLY VERIFYING DEVICE STATE INTEGRITY

CROSS-REFERENCE TO RELATED APPLICATION

This application claims the priority benefit under 35 USC § 119(e) to U.S. Provisional Patent Application No. 62/697,111, entitled "SYSTEM AND METHOD FOR CONTINUOUSLY VERIFYING DEVICE STATE INTEGRITY," naming Pascal Constantin Hans Meier as inventor, and filed Jul. 12, 2018, which application is incorporated by reference herein in its entirety.

TECHNICAL FIELD

The present disclosure relates generally to systems and methods for verifying device state integrity and more particularly to verifying device state integrity continuously.

BACKGROUND OF THE INVENTION

A semiconductor device is controlled by registers, which may also be referred as Control Registers or CRs. CRs are stored internally within the semiconductor device to define how the device is intended to operate. The group of CRs is often referred to as the control register bank. Typically after the device is powered up, these registers are programmed by various means to enable or disable various capabilities of the device. Once these registers have been set up, it is possible that the CRs become corrupted, for example due to errors induced by cosmic rays, or by failure of the device which causes bits to change value.

To ensure that register corruption does not place the device into an undesired state during operation, these registers should be checked periodically. However, it can be time consuming for an external monitor to read every register in the device and verify its value.

It would be desirable to have a system and method to verify device state integrity continuously and efficiently for improved system reliability.

SUMMARY OF THE INVENTION

The invention relates to methods for verifying device state integrity continuously and efficiently. The application of verification method results in an improvement in the performance and reliability of electronic device.

Various embodiments of the invention relate to continuously verifying semiconductor device state integrity. A counter is combined to form part of Cyclic Redundancy Check (CRC) calculation for control registers within the semiconductor device. The counter is initialized to zero and resets after a predetermined number of cycles. The counter value is added to the currently calculated CRC value to get a combined CRC value. Every time a CRC value is calculated for the register bank, the counter value is updated, e.g. incremented. If the CRC calculation is repeated enough times, the counter value will reach its maximum value, and then roll over to its initial value of zero. If no errors occur in the register bank, the combined CRC value at the rolling over point will match an initial combined CRC value. Such a repetitive pattern of the combined CRC value may be used to continuously monitor control register integrity.

In one or more embodiments, the counter may be implemented as a hardware counter, a software counter, or a combination thereof. The counter may be incorporated within the semiconductor device or within the external monitor. The combination algorithm (calculated CRC value in combination with the counter value) may be implemented within the semiconductor device or within the external monitor. When the combination algorithm is implemented in the semiconductor device, the external monitor reads the combined CRC values directly from the semiconductor via a communication link. Alternatively, the external monitor may read the calculated CRC values from the semiconductor via the communication link and then implement a combination operation using counter values and the read CRC value.

In one or more embodiments, a process to periodically check the control registers of a semiconductor device is disclosed. An external monitor reads an initial CRC value for a control register bank within a semiconductor device. A sequence of CRC values are read after the initial CRC value was read. Upon each CRC read, the value that is read may preserve the previous value or may move to a new value. Following successive CRC reads, the value read must move to a new value within a fixed time interval. If the successive reads continue to preserve the CRC value past the fixed time interval, an error is indicated. The calculated CRC value may also be saved within the external monitor for future reference.

One skilled in the art will recognize that the disclosed system and method embodiments for verifying device state integrity may be applicable in various applications to provide a reliable for device status verification. The applications include but are not limited to control register verification, processor register verification, etc., all of which may be useful in, and should fall within the scope of the present invention.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Furthermore, connections between components or systems within the figures are not intended to be limited to direct connections. Rather, data or signal between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Figure 1:
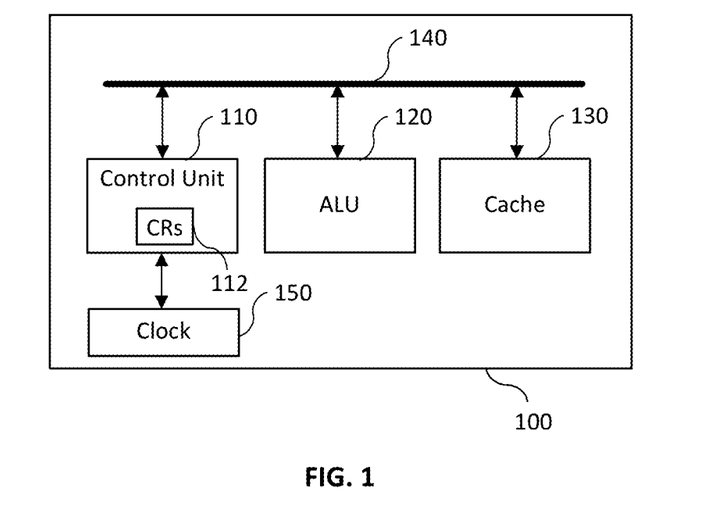
FIG. 1 is a block diagram of a semiconductor device incorporating a control unit and a bank of control registers according to various embodiments of the invention.

FIG. 1 is a block diagram of an exemplary semiconductor device 100 comprising one or more control registers 112, which are used to store state information in bits to define or control general behavior of the semiconductor device, e.g. a CPU, a microcontroller (MCU), etc. The semiconductor device 100 may comprise a control unit 110, an arithmetic logic unit (ALU) 120 to perform arithmetic and bitwise operations, and a cache 130 functioning as a small but quickly accessible storage within the semiconductor device for date/address information storing. The control unit 110 may couple to the ALU 120 and the cache 130 via a control bus 140. The control unit 110 may further couple to a clock circuit 150 to receive a clock signal for regulating operation rate. The control unit 110 directs the operation of the semiconductor device, regulates the ALU 120 and other components how to respond to a program's instructions, etc. The control unit 110 may incorporate one or more control registers 112, which contain sequences of instructions to enable the control unit 110 to perform tasks such as interrupt control, switching the addressing mode, paging control, coprocessor control, etc. In one or more embodiments, the semiconductor device 100 may comprise further components, e.g. I/O interface, data bus, address bus, etc. Typically after the semiconductor device is powered up, these CRs may be programmed by various means to enable or disable various capabilities of the device.

During the operation of the semiconductor device, it is possible that the CRs may become corrupted, for example due to errors induced by cosmic rays, or by status changed resulting from device failure. The corruption or status change of CRs may cause serious consequences, including safety concerns. To ensure that register corruption does not place the device into an undesired state during operation, it is desirable to have these CRs checked periodically. In certain applications, such as in automotive applications employing ISO 26262-compliant functional safety measures, techniques are even required for constant periodic monitoring of semiconductor devices.

Figure 2:
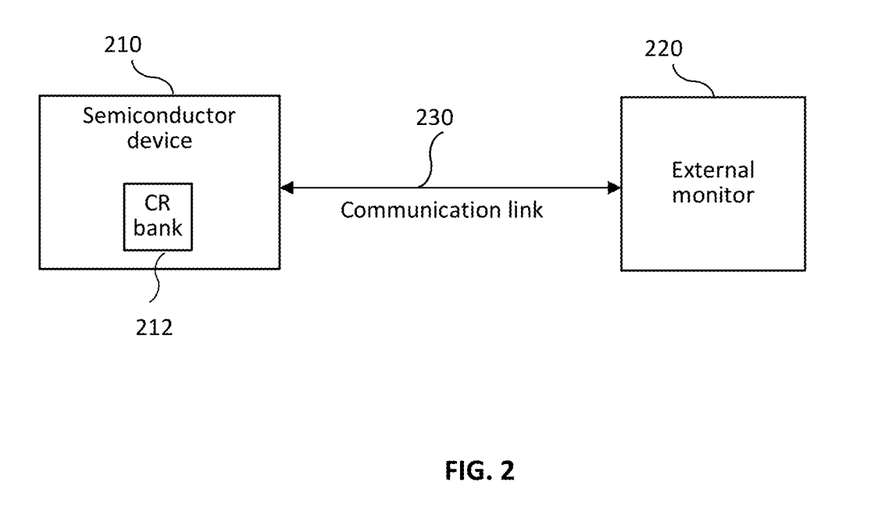
FIG. 2 is a typical system using an external monitor to read a semiconductor device's register bank over a communication link.

FIG. 2 shows a typical system comprising a semiconductor device 210 and an external monitor 220 responsible for communicating to the device's register bank 212 over a communication link 230. The external monitor 220 may be configured to program, initiate or read the CR band 212 within the semiconductor device 210. The process for the external monitor 220 to read every register in the device 210 and verify its value may be time-consuming. To efficiently determine whether the CR bank 212 has changed, a unique 'signature' may be created for all the registers. In one or more embodiments, the signature is a computed value calculated using the internal values of all the registers. The calculation shall be implemented such that at least a certain minimum number of bit errors can be detected when these bits are corrupted in the register bank. Various techniques have been proposed to perform this task, including a CRC method.

In one typical common CRC method, a CRC register is firstly initialized to a default value (typically 0xFFFF_FFFF_...., depending on the size of the CR). The default value is combined with the first register to generate a CRC value, which is then stored back in the CRC register. This calculation is repeated for all the following registers individually to get a final CRC value which incorporates the values of all the registers in the bank. The calculated final CRC can be stored in the device as a stored CRC value. To determine whether the registers have been corrupted at a later point, the final CRC value is calculated a second time to get a second CRC value, which is then compared to the stored CRC value. If there is a mismatch, then a CR error should be indicated.

However, the stored CRC may have itself been corrupted, or an error in the second CRC calculation machinery may have occurred. In these scenarios, an error will be indicated, although the register bank may have not experienced a failure. Such an error indicates that the error-checking flow cannot be trusted.

The calculation of the second CRC may be done periodically, to repeatedly check whether the registers have become corrupt during the long-term operation of the semiconductor device. A problem may also occur when the CRC checking mechanism (through error) fails to update the second CRC. When this happens, the final comparison between the two CRCs will indicate a match result. In this scenario, a corruption of the registers will be undetected.

To resolve the above problem, various procedures and methods are disclosure in this invention document.

In one or more embodiments, in addition to calculating the CRC on the register bank, a counter is combined to form part of the CRC calculation. The counter may reset itself after a predetermined number of cycles. For example, the counter value is added to the currently calculated CRC value to get a combined CRC value. The counter is initialized to a predetermined default value, e.g. zero. Every time a CRC value is calculated for the register bank, the counter value is updated, e.g. incremented. Consequentially, when the CRC computation is calculated next time, the resulting combined CRC value will be different. If the CRC calculation is repeated enough times, the counter value will reach its maximum value, and the following CRC calculation cycle will result in the counter rolling over to a zero value. If no errors occur in the register bank, at this point the combined CRC value that is computed with this zero counter value will match an initial combined CRC value, which was calculated when the counter was initialized as zero. All subsequent combined CRC values will follow the same sequence or pattern as those calculated earlier. Such a repetitive pattern of the combined CRC value may be used to continuously monitor control register integrity.

Figure 3:
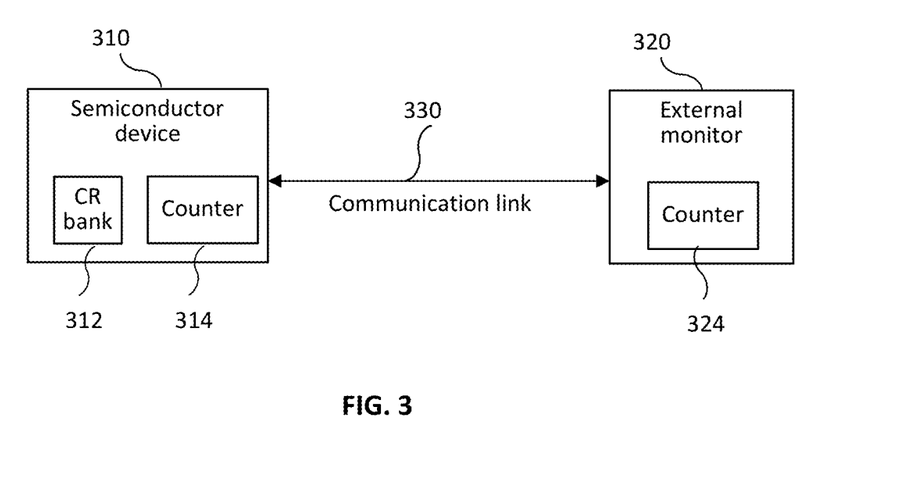
FIG. 3 is a block diagram to read a semiconductor device's register bank over a communication link according to various embodiments of the invention.

FIG. 3 shows a system block diagram to read a semiconductor device's register bank over a communication link according to one or more embodiments of the invention. An external monitor 320 communicates to the semiconductor 310 to read device's register bank 312 over a communication link 330. The external monitor 320 may be configured to program, initiate or read the CR bank 312 within the semiconductor device 310. Compared to FIG. 2, the system shown in FIG. 3 incorporates at least one counter to implement the aforementioned CRC value combination operation. The counter may be implemented as a hardware counter, a software counter, or a combination thereof. The counter may be incorporated within the semiconductor device (counter 314), or within the external monitor (such as counter 324). The combination algorithm (calculated CRC value in combination of counter value) may be implemented within the semiconductor device or within the external monitor. When the combination algorithm is implemented in the semiconductor device, the external monitor 310 reads the combined CRC values directly from the semiconductor 310 via the communication link 330. Alternatively, the external monitor 310 reads the calculated CRC values from the semiconductor 310 via the communication link 330 and implements a combination operation within the external monitor using counter values from the counter 324.

One skilled in the art shall understand that various methods to calculate CRC value for control register may be applied. One skilled in the art shall also understand that various combinations between the calculation CRC value and counter value may also be implemented to obtain a repetitive sequence or pattern. The combination may be any desirable operations, including but not limited to adding, subtracting, or multiplying, etc.

Using the above mechanism involving incorporation of counter values, the exterior monitor may periodically read the CRC value and determine that the calculated or combined CRC values are correct. In an exemplary embodiment with an adding combination between a calculated CRC value for a 16-bit CRC register and a counter value from a 2-bit counter, the counter value rolls over after 4 CRC computations and consequently the combined CRC values also repeats accordingly. With a period for the CRC calculation setting as 60 ms and the external monitor reading the CRC value every 20 ms, the readout of the CRC value (combined CRC value) by the monitor may have this sequence of (CRC numbers below are representative of typical values):

0x5d8a . . . (20 ms) . . . 0x5d8a . . . (20 ms) . . . 0x5d8a . . . (20 ms) . . .
    0x12ff . . . (20 ms) . . . 0x12ff . . . (20 ms) . . . 0x12ff . . . (20 ms) . . .
    0x76be . . . (20 ms) . . . 0x76be . . . (20 ms) . . . 0x76be . . . (20 ms) . . .
    0xda43 . . . (20 ms) . . . 0xda43 . . . (20 ms) . . . 0xda43 . . . (20 ms) . . .
    0x5d8a . . . (20 ms) . . . 0x5d8a . . . (20 ms) . . . 0x5d8a . . . (20 ms) . . .

As shown above, the exemplary combined CRC value readout has a repetitive pattern after 4 CRC calculation cycles. Such a repetitive pattern of the combined CRC value may be used to continuously monitor control register integrity. If the readout does not follow the pattern, a corruption in the register bank is likely to occur.

Figure 4:
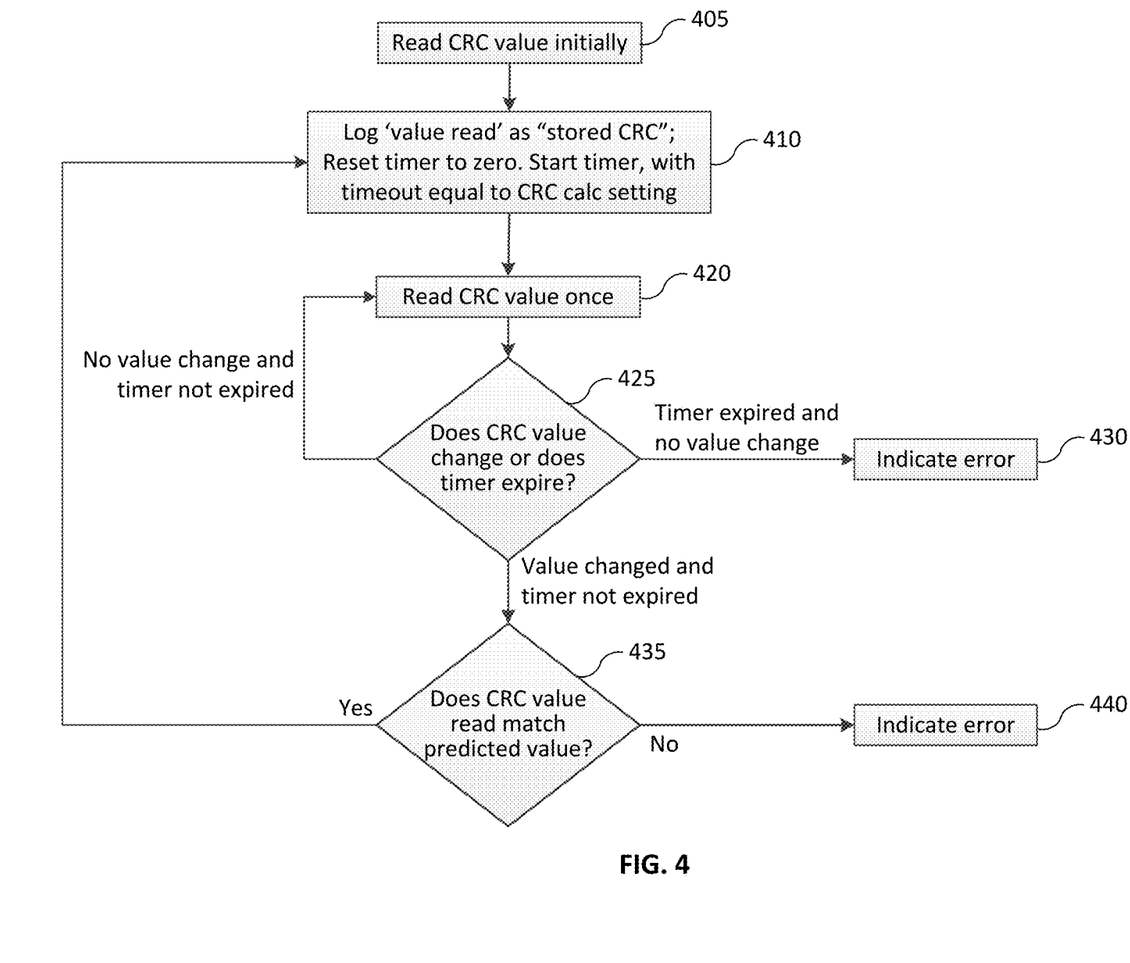
FIG. 4 shows a process to periodically checking control register according to various embodiments of the invention.

FIG. 4 shows a process to periodically checking control register of a semiconductor device according to one or more embodiments of the invention. In this process, the CRC value of the register bank within the semiconductor device is known to the external monitor. For example, the monitor is the one to initially program the register bank to set the device operation. In this case, the monitor knows expected CRC values in advance or is able to precompute the expected CRC values for the purpose of comparing to the read CRC values.

In step 405, the external monitor initially reads a CRC value for a control register bank within a semiconductor device. The initially read CRC value is saved as a stored CRC value by the external monitor in step 410. In one or more embodiments, the stored CRC value may be a calculated CRC value involving the control register status bank alone or a combined CRC value combining from the calculated CRC value and a counter value using the aforementioned method. When the initial CRC value is stored, in a parallel step, the external monitor also resets a reading timer to zero and starts the reading timer with a timeout interval equal to the CRC calculating interval setting. Such timeout interval setting ensures at least one CRC value reading within each CRC calculating interval. In one or more embodiments, there are one or more reading actions from the external monitor within each CRC calculating interval, and therefore the read CRC values within a CRC calculating interval remain unchanged until next CRC calculating interval. For example, as shown in the aforementioned example, the CRC calculation interval is set as 60 ms and the external monitor reads the CRC value every 20 ms. Therefore, in the example, the external monitor reads the CRC value three times within each CRC calculating interval and those three read CRC values are the same.

In step 420, the external monitor reads CRC value again and verifies, in step 425, whether the newly read CRC value change and whether the reading timer expires (the timeout interval reaches). If no CRC value change detected and the timeout interval is not reached, the process goes back to step 420 for another CRC value reading. If no CRC value change detected while the timeout interval is reached, the process goes to step 430, in which the external monitor indicates an error. If the newly read CRC value is different from the stored CRC value and the timer is not expired, the process goes to step 435, in which the newly read CRC value is compared to a predicted CRC value. In one or more embodiments, the monitor is the one to initially program the register bank to set the device operation. Therefore, the monitor is able to precompute a predicted CRC value corresponding to current CRC reading time. If a mismatch is identified between the predicted CRC value and the newly read CRC value, the monitor sends an error message in step 440. If no mismatch is identified, the process goes back to step 410 with the newly read CRC value logged as "stored CRC value". Although FIG. 4 shows one process in step 425 to verify whether the newly read CRC value changes and whether the reading timer expires, one skilled in the art may understand that this step may be implemented in multiple steps sequentially or in parallel. Those variations shall still be within the scope of this invention.

In the absence of the monitor knowing the register values, the CRC computations are periodic and are continuously recomputed. Therefore it suffices to check the read value against one from one corresponding value previously computed. Upon startup, the stored CRC values that are to be compared against are initially unknown and comparisons could not be made with the scheme described above for the first set of CRC computations. It is possible to simply run the system through the initial iterations to create and store the CRC values, without performing the comparison. However, this would introduce a period of 240 ms without the system being continuously checked. A method to resolve this situation is to initially run the CRC computation a certain number of times repeatedly (4 iterations for the example of a 2-bit counter) to establish the values, without pausing between CRC computations. The CRC calculation can typically be performed on the order of 1 ms, so this would simply add ~4 ms to the startup phase, during which continuous checking is absent. This additional time is typically acceptable.

Figure 5:
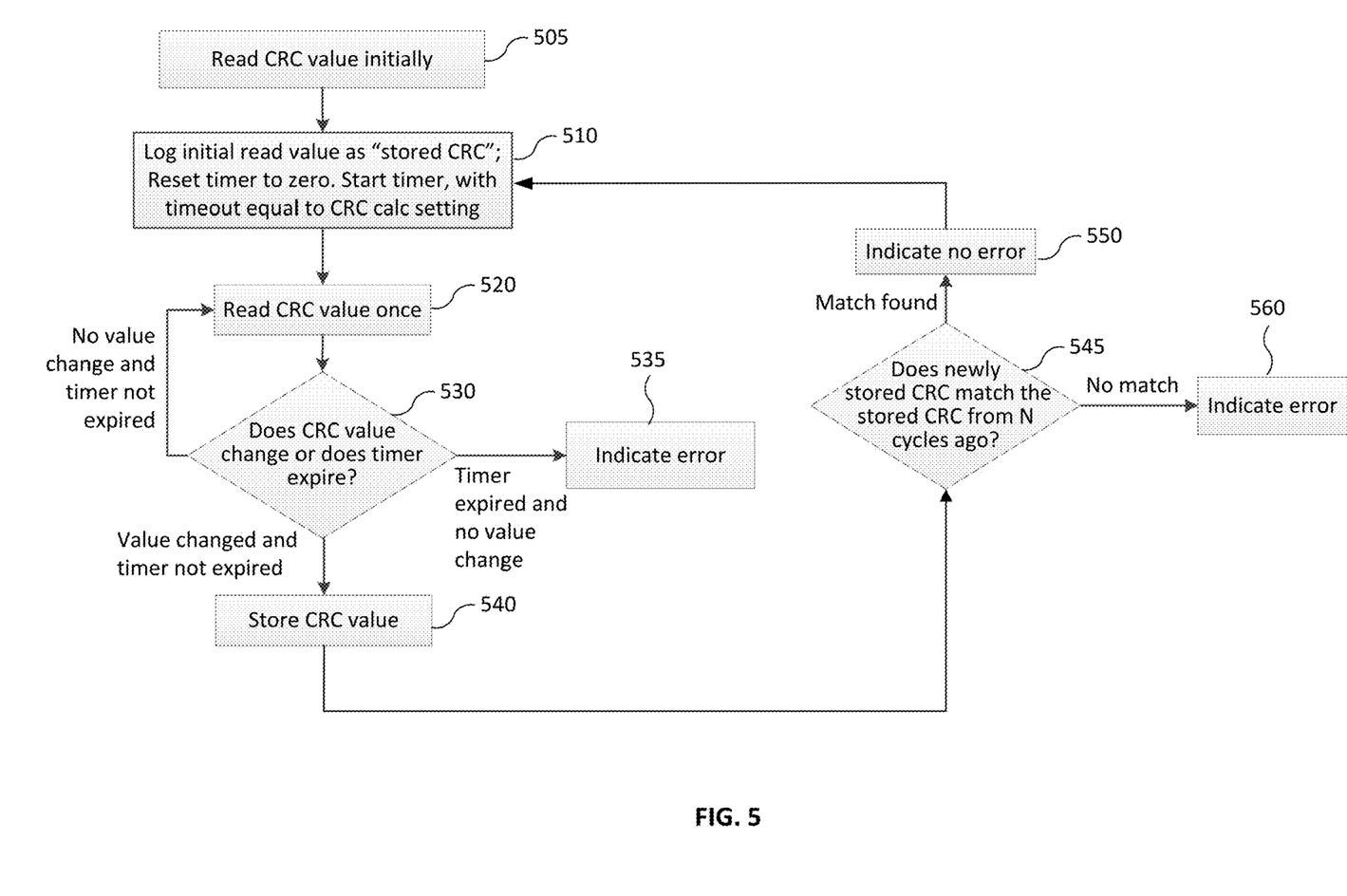
FIG. 5 shows an alternative process to periodically checking control register according to various embodiments of the invention.

FIG. 5 shows an alternative process to periodically checking control register according to one or more embodiments of the invention. In step 505, the external monitor initially reads a CRC value for a control register bank within a semiconductor device. The initially read CRC value is saved as a stored CRC value by the external monitor in step 510. When the initial CRC value is stored, in a parallel step, the external monitor resets a reading timer to zero and starts the reading timer with a timeout interval equal to the CRC calculating interval setting. Such timeout interval setting ensures at least one CRC value reading within each CRC calculating interval. Parameters of CRC calculating interval as well as counter resetting cycle number may be available to the external monitor via preset communication protocols when the external monitor and the semiconductor device connect to each other.

In step 520, the external monitor reads CRC value again and verifies, in step 530, whether the newly read CRC value changes and whether the reading timer expires (the timeout interval reaches). If no CRC value change detected and the timeout interval is not reached, the process goes back to step 520 for another CRC value reading. If no CRC value change detected while the timeout interval is reached, the process goes to step 535, in which the external monitor indicates an error. If the newly read CRC value is different from the stored CRC value and the timer is not expired, the process goes to step 540, in which the newly read CRC value is logged as a newly stored CRC value. Although FIG. 5 shows one process in step 530 to verify whether the newly read CRC value changes and whether the reading timer expires, one skilled in the art may understand that this step may be implemented in multiple steps sequentially or in parallel. Those variations shall still be within the scope of this invention.

Every time a newly read CRC value is logged as newly stored CRC value, the newly stored CRC value is checked, in step 545, against a previously stored CRC value from N cycles ago, wherein N corresponds to CRC calculating cycle numbers for the counter to reset. For the aforementioned example with a 2-bit counter, N is 4.

If a mismatch between the newly stored CRC value and a previously stored CRC value from N cycles ago is identified in step 545, the process goes to step 560, in which an error is indicated and an error message is sent. In response to no mismatch found in step 545, the process goes to step 550, in which the external monitor sends out a message to indicate no error for the control register bank.

In one or more embodiments, after step 550, the process may go back to step 510 for continuous monitoring or the external monitor may hibernate until next CR verification is needed.

Such a CR state verification using a combination of CRC calculation with recurrent count values effectively prevents not only misdetection for "false" CR corruption, but also any CR corruptions from being undetected.

The foregoing description of the invention has been described for purposes of clarity and understanding. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method to verify device state integrity, the method comprising:
    reading a semiconductor device at a current time to obtain a current reading value, the current reading value is a combination of a state value of the semiconductor device at the current time and a counter value from a counter at the current time, the state value is recurrently calculated with a predetermined period, the counter value is updated when the state value is calculated, the counter value is reset after predetermined cycles of state value calculation;
    comparing the current reading value to a stored value, the stored value was obtained from reading the semiconductor device a predetermined time interval before the current time, the stored value is a combination of the state value of the semiconductor device at the predetermined time interval before the current time and the counter value at the predetermined time interval before the current time; and
    verifying a state integrity of the semiconductor device based at least on the comparison.

2. The method of claim 1 wherein the state value of the semiconductor device is related to state of one or more control registers within the semiconductor device.

3. The method of claim 1 wherein the state value is calculated using a Cyclic Redundancy Check (CRC) method.

4. The method of claim 1 wherein the predetermined time interval is based on the predetermined period and the predetermined cycles.

5. The method of claim 1 further comprising in response to a mismatch found between the current value and the stored value, sending an error message for the state integrity.

6. The method of claim 1 further comprising in response to no mismatch found between the current value and the stored value, sending a message indicating no error for the state integrity.

7. A method to verify device state integrity continuously, the method comprising:
    repetitively reading a semiconductor device with a predetermined reading interval to obtain a sequence comprising a plurality of reading values, each reading value is a combination of a state value of the semiconductor device and a counter value, the state value is recurrently calculated in a predetermined cycle, the counter value is updated when the state value is calculated, the counter value is reset after predetermined cycles of state value calculation; and
    verifying a state integrity of the semiconductor device based at least on the obtained sequence.

8. The method of claim 7 further comprising:
comparing the obtained sequence to an expected sequence;
in response to a mismatch found between the obtained sequence and the expected sequence, sending an error message for the state integrity; and
in response to no mismatch found between the obtained sequence and the expected sequence, sending a message indicating no error for the state integrity.

9. The method of claim 7 wherein the state value of the semiconductor device is related to state of one or more control registers within the semiconductor device.

10. The method of claim 7 wherein the state value is calculated using a Cyclic Redundancy Check (CRC) method.

11. The method of claim 7 wherein in response to no value changes for the obtained sequence, sending an error message for the state integrity.

12. A method to verify a state integrity for a semiconductor device, the method comprising:
reading the semiconductor device initially to obtain a state value of the semiconductor device, the state value of the semiconductor device is periodically calculated based on states of one or more registers within the semiconductor device with a predetermined period;
combining the state value obtained at the initial reading with a counter value to obtain an initial combined value;
reading the semiconductor device at least one more time within a predetermined time interval to obtain at least one additional state value of the semiconductor device, the predetermined time interval is larger than the predetermined period to enable at least one calculation of the state value of the semiconductor device during the predetermined time interval;
combining the at least one additional state value with the counter value to obtain at least one additional combined value, the counter value is updated when the state value of the semiconductor device is calculated;
comparing the at least one additional combined value to the initial combined value; and
in response to no value change found between the at least one additional combined value and the initial combined value, sending an error message for the state integrity.

13. The method of claim 12 wherein the combination of the initial state value with the counter value and the combination of the at least one additional state value with the counter value are implemented externally to the semiconductor device.

14. The method of claim 12 further comprising:
in response to value change found between the at least one additional combined value and the initial combined value, comparing the changed value to a predicted value.

15. The method of claim 14 further comprising:
in response to a mismatch found between the changed value and the predicted value, sending an error message for the state integrity.

16. The method of claim 14 further comprising:
in response to no mismatch found between the changed value and the predicted value, sending a message indicting no error for the state integrity.

17. The method of claim 12 wherein the one or more registers are control registers within the semiconductor device.

18. The method of claim 14 wherein the state value of the semiconductor device is calculated using a Cyclic Redundancy Check (CRC) method.

* * * * *